(12) United States Patent
Kadobayashi et al.

(10) Patent No.: US 10,905,532 B2
(45) Date of Patent: Feb. 2, 2021

(54) MILL BLANK FOR DENTAL CAD/CAM WITH RESIN PORTION CONTACTED WITH CAM DEVICE

(71) Applicant: SHOFU INC., Kyoto (JP)

(72) Inventors: Yusei Kadobayashi, Kyoto (JP); Masako Shigezawa, Kyoto (JP)

(73) Assignee: SHOFU INC., Kyoto (JP)

( * ) Notice: Subject to any disclaimer, the term of this patent is extended or adjusted under 35 U.S.C. 154(b) by 293 days.

(21) Appl. No.: 15/685,118

(22) Filed: Aug. 24, 2017

(65) Prior Publication Data

US 2018/0055613 A1 Mar. 1, 2018

(30) Foreign Application Priority Data

Aug. 26, 2016 (JP) .................. 2016-166080

(51) Int. Cl.
*A61C 13/00* (2006.01)

(52) U.S. Cl.
CPC ...... *A61C 13/0022* (2013.01); *A61C 13/0004* (2013.01)

(58) Field of Classification Search
CPC .................................. A61C 13/0022
See application file for complete search history.

(56) References Cited

U.S. PATENT DOCUMENTS 6,713,421 B1 * 3/2004 Hauptmann .......... C04B 35/486
433/202.1
2003/0125189 A1 7/2003 Castro et al.
(Continued)

FOREIGN PATENT DOCUMENTS

DE  10 2007 013 675    10/2008
DE  10 2012 201 744    8/2013
(Continued)

OTHER PUBLICATIONS

Notification of Reasons for Refusal dated Oct. 4, 2016 in corresponding Japanese Application No. 2016-166080, with English translation.

(Continued)

*Primary Examiner* — Ian A Rummel
(74) *Attorney, Agent, or Firm* — Wenderoth, Lind & Ponack, L.L.P.

(57) ABSTRACT

To provide a mill blank for dental CAD/CAM containing a ceramic material for preparing a dental restoration by being installed in a CAD/CAM device, wherein, the mill blank for dental CAD/CAM comprises a ceramic portion in which a dental restoration is cut out and a resin portion which joins with a CAD/CAM device, the mill blank for dental CAD/CAM has a columnar shape, the resin portion is provided at a side surface of the ceramic portion and has a cylindrical shape or a belt shape, a ceramic portion side of the resin portion contacts with the side surface of the ceramic portion, the ceramic portion has a columnar shape, the ceramic portion has a protrusion part, an upper surface and a bottom surface of the columnar shape of the ceramic portion are parallel to each other, the mill blank for dental CAD/CAM has at least two recesses which includes a first recess and a second recess in a circumference portion, the first recess and the second recess respectively include a first surface which is parallel to the upper surface and the bottom surface and a second surface which is a circumferential surface concentric with the circumferential surface of the mill blank for dental CAD/CAM and is vertical to the first surface, and the at least two recesses are formed within the resin portion.

16 Claims, 5 Drawing Sheets

(56) References Cited

U.S. PATENT DOCUMENTS

| | | |
|---|---|---|
| 2004/0072121 A1 | 4/2004 | Filser et al. |
| 2007/0275352 A1 | 11/2007 | Gubler et al. |
| 2010/0028836 A1 | 2/2010 | Gubler et al. |
| 2010/0297580 A1* | 11/2010 | Niewiadomski ... A61C 13/0009 433/167 |
| 2011/0042880 A1* | 2/2011 | Konrad ............. A61C 13/0022 269/287 |
| 2016/0206411 A1 | 7/2016 | Kutzner et al. |
| 2017/0333168 A9 | 11/2017 | Schuetz |
| 2018/0243055 A1 | 8/2018 | Ito et al. |

FOREIGN PATENT DOCUMENTS

| | | |
|---|---|---|
| EP | 3 067 013 | 9/2016 |
| JP | 2005-501571 | 1/2005 |
| JP | 2005-514305 | 5/2005 |
| JP | 2006-521842 | 9/2006 |
| JP | 2012-5874 | 1/2012 |
| WO | 2007/143765 | 12/2007 |
| WO | 2016/148286 | 9/2016 |

OTHER PUBLICATIONS

Notification of Reasons for Refusal dated Jan. 25, 2017 in corresponding Japanese Application No. 2016-166080, with English translation.
Extended European Search Report dated Dec. 22, 2017 in corresponding European Application No. 17187855.6.
Office Action dated Dec. 18, 2019 in corresponding European Application No. 17187855.6.

\* cited by examiner

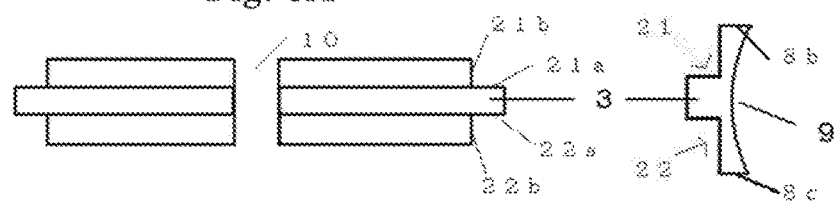
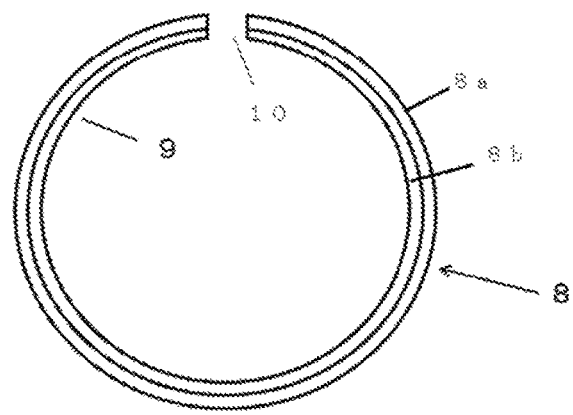
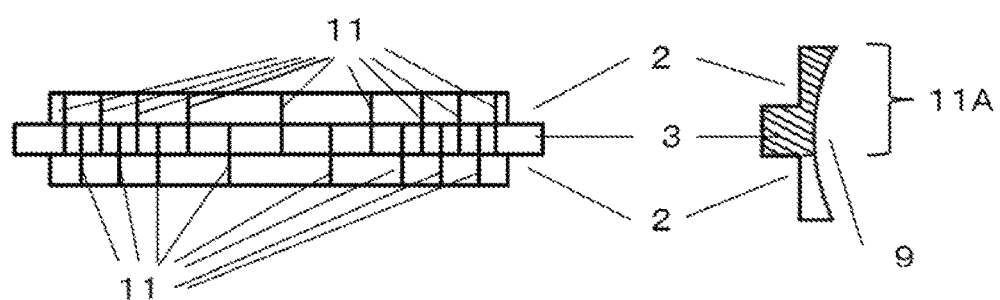

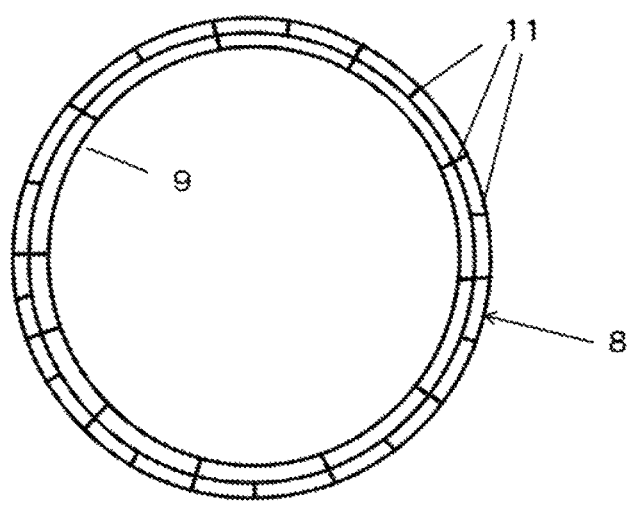
Fig. 5
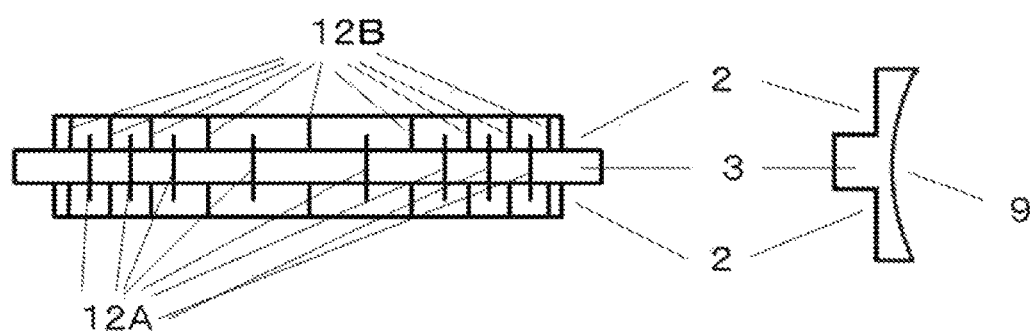
Fig. 6A
Fig. 6B

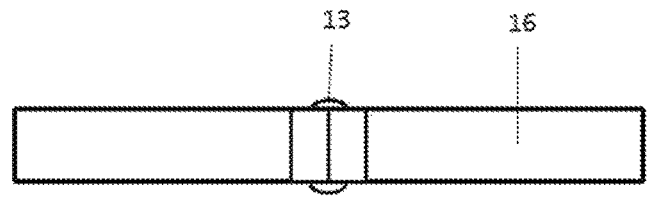
Fig. 9A
Fig. 9B
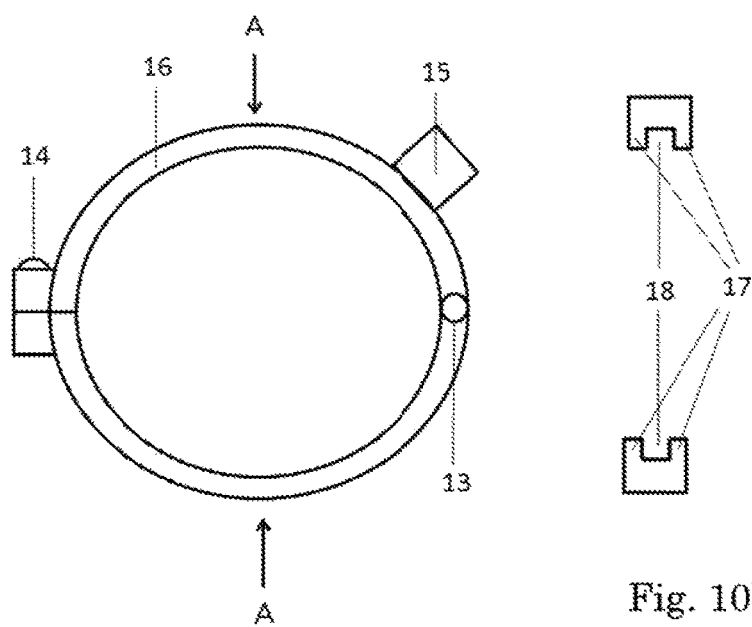
Fig. 10A
Fig. 10B

MILL BLANK FOR DENTAL CAD/CAM WITH RESIN PORTION CONTACTED WITH CAM DEVICE

CROSS-REFERENCE TO RELATED APPLICATIONS

This application is based on and claims the benefit of priority from Japanese Patent Application Serial No. 2016-166080 (filed on Aug. 26, 2016), the contents of which are hereby incorporated by reference in their entirety.

BACKGROUND OF THE INVENTION

Field of the Invention

The present disclosure relates to a mill blank for dental CAD/CAM used for preparing a dental restoration and specifically, to a mill blank for dental CAD/CAM having a columnar disk shape.

Description of the Related Art

In the dental field, it has been known that a dental restoration is prepared by cutting a mill blank by using a CAD/CAM technique. In recent years, a plurality of dental restorations have been prepared by cutting one mill blank by using this CAD/CAM technique.

In the conventional mill blank, whole of the mill blank consists of ceramic and the mill blank joins to the CAM via a metal arm. Therefore, when a dental restoration consists of ceramic is cut out from the conventional mill blank, a chipping of the mill blank often occurs. In addition to such chipping of the mill blank in installing to the CAM, there are problems such as a chipping of the mill blank by too tightly fastening of a screw in fastening the metal arm and the ceramic, a cracking and a chipping of the mill blank by accumulating a stress between the metal arm and the ceramic, which is caused by vibration in cutting, and an abrasion of the metal arm by wearing the metal arm and the ceramic, in the conventional mill blank.

Further, it is necessary to provide a recess which has an accurate shape according to a shape of the metal arm of the CAM on the side surface of the mill blank for dental CAD/CAM, and labor and time are required for processing such recess. In addition, the cutting apparatus is necessary because a many ceramic part is cut.

Japanese Unexamined Patent Application Publication No. 2012-5874 (JP 2012-5874 A) discloses a mill blank which has a columnar shape and is provided with a circumference groove.

However, when this conventional mill blank is installed in the CAM, the mill blank for dental CAD/CAM which consists of ceramic directly joins to the metal arm. Therefore, it was impossible to prevent a cracking, a chipping and an abrasion.

SUMMARY OF THE INVENTION

Technical Problem

In the conventional mill blank, there are problems such as a chipping of the mill blank in installing to the CAM, a chipping of the mill blank by too tightly fastening of a screw in fastening the metal arm and the ceramic, a cracking and a chipping of the mill blank by vibration in cutting, and an abrasion of the metal arm.

Further, it is necessary to provide a recess which has an accurate shape according to a shape of the metal arm of the CAM on the side surface of the mill blank for dental CAD/CAM, and labor and time are required for processing such recess. In addition, the cutting apparatus is necessary because a many ceramic part is cut.

Solution to Problem

The present disclosure provides a mill blank for dental CAD/CAM containing a ceramic material for preparing a dental restoration by being installed in a CAD/CAM device, wherein, the mill blank for dental CAD/CAM comprises a ceramic portion in which a dental restoration is cut out and a resin portion which joins with a CAD/CAM device, the mill blank for dental CAD/CAM has a columnar shape, the resin portion is provided at a side surface of the ceramic portion and has a cylindrical shape or a belt shape, a ceramic portion side of the resin portion contacts with the side surface of the ceramic portion, the ceramic portion has a columnar shape, the ceramic portion has a protrusion part, an upper surface and a bottom surface of the columnar shape of the ceramic portion are parallel to each other, the mill blank for dental CAD/CAM has at least two recesses which includes a first recess and a second recess in a circumference portion, the first recess and the second recess respectively include a first surface which is parallel to the upper surface and the bottom surface and a second surface which is a circumferential surface concentric with the circumferential surface of the mill blank for dental CAD/CAM and is vertical to the first surface, and the at least two recesses are formed within the resin portion.

In the present disclosure, it is preferable that the diameter of the columnar shape of the mill blank for dental CAD/CAM is within a range of 95 to 100 mm, and a height of the columnar shape of the mill blank for dental CAD/CAM is within a range of 10 to 35 mm.

In this case, it is preferable that a diameter of the columnar shape of the ceramic portion is within a range of 90 to 96 mm, and a height of the columnar shape of the ceramic portion is within a range of 10 to 35 mm.

Further, in this case, it is preferable that a distance between the first recess and the second recess in the axial direction of the columnar shape of the mill blank for dental CAD/CAM is within a range of 9 to 11 mm.

Further, in this case, it is preferable that a dimension from the center axis of the columnar shape of the mill blank for dental CAD/CAM to the first recess and the second recess is within a range of 91 to 98 mm.

In the present disclosure, it is preferable that an external shape in a state that the resin portion is attached to the side surface of the ceramic portion is the same as an external shape of the mill blank for dental CAD/CAM.

In the present disclosure, it is preferable that in a state that the resin portion is attached to the side surface of the ceramic portion, a height of the resin portion of the mill blank for dental CAD/CAM is the same as a height of the ceramic portion of the mill blank for dental CAD/CAM, when the resin portion has the belt shape, the both ends of the resin portion do not contact with each other to provide a gap between the both ends, in a state that the resin portion is attached to the side surface of the ceramic portion, when the resin portion has the cylindrical shape, the resin portion has at least one slit.

In the present disclosure, it is preferable that the diameter of the columnar shape of the mill blank for dental CAD/CAM is 98 mm, and the height of the columnar shape of the mill blank for dental CAD/CAM is 14, 18 or 26 mm, a distance between the first recess and the second recess in the axial direction of the columnar shape of the mill blank for dental CAD/CAM is 10 mm, and a dimension from the center axis of the columnar shape of the mill blank for dental CAD/CAM to the first recess and the second recess is 94 mm.

In the present disclosure, it is preferable that a part of the upper surface and a part of the bottom surface consist of the resin portion.

In the present disclosure, it is preferable that the ceramic portion consists of a ceramic material which is semi-sintered or is not subjected to final sintering.

In the present disclosure, it is preferable that the ceramic material contains alumina or zirconia at a ratio of 95 wt. % or more.

In the present disclosure, it is preferable that a primary average particle diameter of the ceramic material is within the range of 0.01 to 10 μm.

The present disclosure provides an adaptor for a mill blank for dental CAD/CAM used in the mill blank for dental CAD/CAM of the present disclosure, wherein the adaptor consists of the resin portion which is attached to the ceramic portion of the mill blank for dental CAD/CAM.

The present disclosure provides a cut portion for a mill blank for dental CAD/CAM used in the mill blank for dental CAD/CAM of the present disclosure, wherein the cut portion consists of the ceramic portion of the mill blank for dental CAD/CAM.

Advantageous Effects of Invention

In the mill blank for dental CAD/CAM of the present disclosure, a contact portion which joins to the joint portion of the CAM is constituted of a resin portion. Therefore, because an abrasion of the joint portion may not occur, it is unnecessary to exchange the joint portion even if the joint portion is used for long time, for long term.

When the mill blank for dental CAD/CAM of the present disclosure is installed to a joint portion to the CAM, a chipping which occur in the conventional mill blank for dental CAD/CAM may be prevented.

In the mill blank for dental CAD/CAM of the present disclosure, a cracking, a chipping and a falling off in cutting may be prevented. Therefore, a use life of the cutting apparatus which cuts the mill blank for dental CAD/CAM may be prolonged.

In the mill blank for dental CAD/CAM of the present disclosure, a cracking, a chipping and a falling off of the mill blank for dental CAD/CAM and a falling off of the ceramic portion from the resin portion may be prevented, and the mill blank for dental CAD/CAM is suitably held by a joint portion to the CAM. Further, the ceramic portion of the mill blank for dental CAD/CAM is large. Therefore, many dental restorations are designed in the ceramic portion.

BRIEF DESCRIPTION OF THE DRAWINGS

FIG. 3(A) is a side view of a resin portion having a belt shape used in a mill blank for dental CAD/CAM of one embodiment of the present disclosure.

FIG. 3(B) is a plane view of a resin portion having a belt shape used in a mill blank for dental CAD/CAM of one embodiment of the present disclosure.

FIG. 3(C) is a sectional view of a resin portion having a belt shape used in a mill blank for dental CAD/CAM of one embodiment of the present disclosure.

FIG. 4(A) is a side view of a resin portion having a cylindrical shape used in a mill blank for dental CAD/CAM of one embodiment of the present disclosure.

FIG. 4(B) is a sectional view of a resin portion having a cylindrical shape used in a mill blank for dental CAD/CAM of one embodiment of the present disclosure.

FIG. 5 is a plane view of the resin portion having the cylindrical shape used in the mill blank for dental CAD/CAM shown in FIG. 4(A) and FIG. 4(B).

FIG. 6(A) is a side view of a resin portion having a cylindrical shape used in a mill blank for dental CAD/CAM of one embodiment of the present disclosure.

FIG. 6(B) is a sectional view of a resin portion having a cylindrical shape used in a mill blank for dental CAD/CAM of one embodiment of the present disclosure.

FIG. 9(A) is a side view of a conventional holding portion of the CAM.

FIG. 9(B) is a side view of a conventional holding portion of the CAM viewed from a different direction from the direction of FIG. 9(A).

FIG. 10(A) is a plane view of a conventional holding portion of the CAM.

FIG. 10(B) is a sectional view taken along the line A-A' of FIG. 10(A).

DETAILED DESCRIPTION OF THE PREFERRED EMBODIMENTS

Figure 1A:
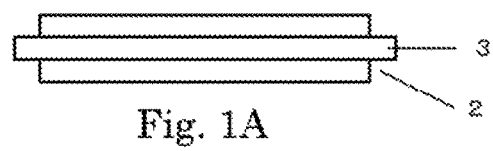
FIG. 1(A) is a side view of a conventional mill blank for dental CAD/CAM (disk).
Figure 1B:
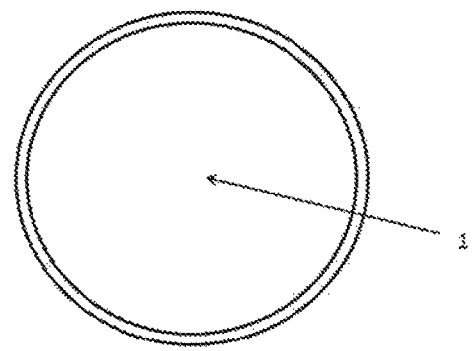
FIG. 1(B) is a plane view of a conventional mill blank for dental CAD/CAM (disk).

Now a specific description of the present disclosure is given.

A mill blank for dental CAD/CAM of the present disclosure comprises a ceramic portion which is a molded body for cutting out a dental restoration by using a CAD/CAM technique and a resin portion which connects to a holding portion of the CAM. The resin portion may be detachable from the ceramic portion and the resin portion may bond to the ceramic portion.

The mill blank for dental CAD/CAM of the present disclosure has a substantially columnar shape and may have, for example, a diameter of the columnar shape of the mill blank for dental CAD/CAM is within a range of 95 to 100 mm, and a height of the columnar shape of the mill blank for dental CAD/CAM is within a range of 10 to 35 mm. It is preferable that the diameter of the columnar shape of the mill blank for dental CAD/CAM is 98 mm and the height of the columnar shape of the mill blank for dental CAD/CAM is 14, 18 or 26 mm. It is preferable that an upper surface and a bottom surface of the mill blank for dental CAD/CAM is parallel each other and a side surface of the mill blank for dental CAD/CAM is vertical to the upper surface and the bottom surface.

The ceramic portion has a substantially columnar shape or a columnar shape and has a protrusion part on a side surface of the columnar shape of the ceramic portion. As an example of the size of the columnar shape of the ceramic portion, a diameter of the columnar shape of the ceramic portion may be within a range of 90 to 96 mm, and a height of the columnar shape of the ceramic portion may be within a range of 10 to 35 mm. An upper surface and a bottom surface of the columnar shape of the ceramic portion are parallel to each other. It is preferable that the whole protrusion part on the side surface protrudes without a step (or without difference in level) from the upper surface and the bottom surface to the substantially center of the upper surface and the bottom surface.

Further, it is preferable that the side surface of the ceramic portion smoothly protrudes except a transition portion of the upper surface and the side surface and a transition portion of the bottom surface and the side surface. It is more preferable that the side surface of the ceramic portion is formed so as to have a circular arc portion on a concentric circles concentric with the upper surface and the bottom surface in any section cut along a surface vertical to the center axis of the ceramic portion. It is further preferable that the side surface of the ceramic portion is formed so as to have a circle shape concentric with the upper surface and the bottom surface in any section cut along a surface including the center axis of the ceramic portion.

In addition, it is preferable that the side surface of the ceramic portion is formed so as to have a constant arc portion in any section cut along a surface including the center axis of the ceramic portion. It is more preferable that the side surface of the ceramic portion is formed so as to have a constant circular arc portion in any section cut along a surface including the center axis of the ceramic portion. In this case, it is preferable that the length of the circular arc portion is constant in any section cut along a surface including the center axis of the ceramic portion.

It is preferable that the side surface of the ceramic portion is constituted of a side surface of a sphere or of a rotating body (or solid of revolution). In this case, it is preferable that a rotation axis of a sphere or of a rotating body is the same as the rotation axis of the columnar shape of the ceramic portion. In view of designing a dental restoration, a plane curve of a rotating body is preferably a smooth ridge such as a circle, an oval and a hyperbola. Further, it is preferable that a plane curve of a rotating body is symmetric up and down with respect to a surface which is vertical to the center axis of the columnar shape and bisects the columnar shape so that the volumes are the same each other. Furthermore, it is preferable that a plane curve of a rotating body is a circle having a center at the center of gravity of the columnar shape of the ceramic portion. It is preferable that the side surface of the ceramic portion is constituted of a sphere having a center at the center of gravity of the columnar shape of the ceramic portion.

The ceramic portion may be prepared by pressing a ceramic material provided into a mold, and curing or temporary calcining by heating the pressed material. Preferable ceramic materials include an aluminosilicate glass, zirconia and alumina. It is preferable that the ceramic material contains alumina or zirconia at a ratio of 95 wt. % or more. Further, it is preferable that the primary average particle diameter of the ceramic material is within a range of 0.01 to 10 μm, in this case.

The ceramic portion may have a single layer structure having single color by coloring a ceramic material. Further, the ceramic portion may be prepared by molding a plurality of stacked layers having different colors from each other. In this case, the ceramic portion may have 2 to 8 layers. Among them, it is preferable that the ceramic portion has at least three layers including an enamel color layer, a dentin color layer and a cervical area color layer.

The ceramics portion may consist of a ceramic material which is subjected to final sintering, a ceramic material which is semi-sintered or a ceramic material which is not subjected to final sintering. It is preferable that the ceramics portion may consist of a ceramic material which is semi-sintered or a ceramic material which is not subjected to final sintering. An effect of the present disclosure that a breakage such as cracking and chipping and falling off in cutting from the holding portion are prevented is remarkably exhibited in a ceramic material which is not subjected to final sintering.

A dental restoration may be prepared by final sintering a ceramic material which is semi-sintered or a ceramic material which is not subjected to final sintering after cutting and machining In the present disclosure, a dental restoration includes a dental prosthesis and an artifact used for a dental prosthesis such as an inlay, a crown, a bridge and an artificial tooth.

Although a semi-sintered temperature (sintered temperature in sintering before final sintering) and a final sintering temperature vary according to the ceramic material, it is preferable that a semi-sintered temperature is within a range of 700° C. to 1200° C., and a final sintering temperature is within a range of 1100° C. to 1800° C. When a final sintering temperature is within this range, a dental restoration having appropriate strength and characteristics may be prepared. When a semi-sintered temperature is within this range, a semi-sintered ceramic material having appropriate strength and characteristics for keeping formativeness and having excellent cutting properties in cutting and machining may be prepared.

It is preferable that a difference between a semi-sintered temperature and a final sintering temperature is within a range of approximately 100° C. to 400° C. The difference between a semi-sintered temperature and a final sintering temperature is caused from the difference between a final sintering for preparing a dental restoration having appropriate strength and characteristics and a semi-sintered for preparing a semi-sintered ceramic material having appropriate strength and characteristics for keeping formativeness and having excellent cutting properties in cutting and machining.

The resin portion is provided on a side surface of the ceramic portion. When the resin portion is removed from the ceramic portion, the resin portion has, for example, a belt shape or a cylindrical shape. The resin portion includes a resin material, and more specifically, the resin portion consists of vinyl chloride resin, acrylic resin, ABS resin, Bakelite, nylon, PTFE (fluoro resin), polycarbonate (PC), polypropylene (PP) and/or polyethylene (PE). It is preferable that the resin portion only consists of only a resin material and does not include an inorganic filler.

Preferable method of forming the resin portion is an injection molding. Further, it is preferable that the resin portion prepared by an injection molding is mounted on the ceramic portion.

A surface of the resin portion, which contacts with the ceramic portion, has preferably an inversion shape of a side surface of the ceramic portion. In this case, the resin portion may closely adhere to the ceramic portion.

A circumference portion of the resin portion has at least two recesses which includes a first recess and a second recess. It is preferable that the first recess is provided on a transition portion of the upper surface and the side surface and the second recess is provided on a transition portion of the bottom surface and the side surface. The recesses are formed within the resin portion.

It is preferable that the resin portion is formed from the upper surface to the bottom surface of the mill blank for dental CAD/CAM. However, when the resin portion has a belt shape, it is preferable that the both ends of the resin portion do not contact with each other to provide a gap between the both ends so that the mill blank for dental CAD/CAM does not have the resin portion over the whole of the circumference. Further, when the resin portion has a cylindrical shape, it is preferable that the resin portion has a slit so that the mill blank for dental CAD/CAM does not have the resin portion over the whole of the circumference. By such configuration, the resin portion may be easily mounted on the ceramic portion.

It is preferable that the resin portion constitutes a part of the upper surface and a part of the bottom surface in a circumferential shape having a width of 0.1 to 3 mm and more preferably 0.1 to 2 mm.

When the resin portion mounted on the ceramic portion has a belt shape, it is preferable that a dimension of the gap in the circumference direction which is provided by not contacting with the both ends of the belt each other is within a range of 1 to 15 mm, more preferably 1 to 10 mm. When the gap is too small, because the both ends contact with each other by expansion and contraction of the belt and long year use of the belt, the ceramic portion may be not held sufficiently.

When the resin portion mounted on the ceramic portion has a cylindrical shape, the number of the slit formed on the ceramic portion is at least two, preferably is within a range of 2 to 100, more preferably is within a range of 2 to 60.

The slit cuts the mill blank for dental CAD/CAM from a side surface of the mill blank for dental CAD/CAM to a surface which contacts with the ceramic portion. The shape of the slit may be a rift or a groove. Further, the shape of a section of the slit in the side surface of the mill blank for dental CAD/CAM may be a straight line or a curved line.

The direction in which the slit extends is not vertical to the center axis of the columnar shape of the mill blank for dental CAD/CAM. It is preferable that the slit forms a surface in which an inclination angle relative to the center axis of the columnar shape is within a range of 0° to 45°. It is more preferable that the slit forms a surface which is parallel to the center axis of the columnar shape. It is further more preferable that the slit forms a surface which is parallel to the center axis of the columnar shape and includes the center axis of the columnar shape.

It is preferable that any sections cut along a surface vertical to the center axis of the columnar shape of the mill blank for dental CAD/CAM include at least one slit. It is more preferable that any sections cut along a surface vertical to the center axis of the columnar shape of the mill blank for dental CAD/CAM include four or more slits.

By varying a position, a shape and the number of the slit, the holding power for the ceramic portion is increased and a breakage of the resin portion is prevented.

The resin portion of the mill blank for dental CAD/CAM of the present disclosure has at least two recesses in a circumference portion of the columnar shape. It is preferable that the resin portion of the mill blank for dental CAD/CAM of the present disclosure has at least two recesses which includes a first recess opening to an upper surface of the resin portion and a second recess opening to a bottom surface of the resin portion. Thus, it is preferable that the first recess is provided on a transition portion of the upper surface and the side surface and the second recess is provided on a transition portion of the bottom surface and the side surface. The resin portion of the mill blank for dental CAD/CAM of the present disclosure may have other recess other than the at least two recesses.

The first recess and the second recess respectively include a first surface which is parallel to the upper surface and the bottom surface of the mill blank for dental CAD/CAM and a second surface which is a circumferential surface concentric with the circumferential surface of the mill blank for dental CAD/CAM and is vertical to the first surface of the resin portion.

It is preferable that the second surface contacts with the upper surface or the bottom surface of the mill blank for dental CAD/CAM and does not contact with the side surface of the mill blank for dental CAD/CAM. It is preferable that the first surface contacts with the side surface of the mill blank for dental CAD/CAM and does not contact with the upper surface and the bottom surface of the mill blank for dental CAD/CAM.

In preferable embodiment, for example, the first recess and the second recess may be formed so that a distance between the first recess and the second recess in the axial direction of the columnar shape of the mill blank for dental CAD/CAM is within a range of 9 to 11 mm. Further, the first recess and the second recess may be formed so that a dimension from the center axis of the columnar shape of the mill blank for dental CAD/CAM to the first recess and the second recess is within a range of 91 to 98 mm, in preferable embodiment. In more preferable embodiment, for example, the first recess and the second recess may be formed so that the distance between the first recess and the second recess in the axial direction of the columnar shape of the mill blank for dental CAD/CAM is 10 mm. Further, the first recess and the second recess may be formed so that the dimension from the center axis of the columnar shape of the mill blank for dental CAD/CAM to the first recess and the second recess is 94 mm.

The first surface is visible from an upper surface side and a bottom surface side of the columnar shape of the mill blank for dental CAD/CAM and has a planar ring shape.

The first surface engages with a holding portion of the CAM to fix the mill blank for dental CAD/CAM to the CAM. Because the first surface is composed of a plane surface, the first surface may easily engage with the holding portion of the CAM. Therefore, the first surface may stably engage with the holding portion of the CAM.

The second surface is visible from a side surface side of the columnar shape of the mill blank for dental CAD/CAM and is a circumferential surface concentric with the circumferential surface of the mill blank for dental CAD/CAM. The second surface engages with the holding portion of the CAM to fix the mill blank for dental CAD/CAM to the CAM. Because the second surface is composed of a curved surface, the second surface may easily engage with the holding portion of the CAM. Therefore, the second surface may stably engage with the holding portion of the CAM.

The CAM in the present disclosure cuts the mill blank for dental CAD/CAM of the present disclosure and has a holding portion which holds the resin portion of the mill blank for dental CAD/CAM over the whole of the circumference. When the both ends of the resin portion do not contact with each other by forming a space or a slit on the mill blank for dental CAD/CAM, the recess does not extend over the whole of the circumference portion of the mill blank for dental CAD/CAM. In this case, the holding portion of the CAM does not hold the mill blank for dental CAD/CAM over the whole of the circumference. However, the holding portion of the CAM may strongly hold the mill blank for dental CAD/CAM by holding the resin portion.

Because the mill blank for dental CAD/CAM is held by the resin portion, it may be prevented that a breakage such as cracking and chipping and falling off from the holding portion of the mill blank for dental CAD/CAM occur.

The holding portion of the CAM may have, for example, a cylindrical shape which may holds the recess of the mill blank for dental CAD/CAM. The mill blank for dental CAD/CAM may be held by nipping with two cylindrical members which constitute the holding portion. Alternatively, the mill blank for dental CAD/CAM may be held by nipping with two half cylindrical members formed with grooves which may hold the recess of the mill blank for dental CAD/CAM.

When the resin portion may be detachable from the ceramic portion, the resin portion corresponds to an adopter for the mill blank for dental CAD/CAM, and the ceramic portion corresponds to a cut part for the mill blank for dental CAD/CAM.

Next, a specific description is given with reference to the drawings.

FIGS. 1(A) and (B) respectively show a side view and a plane view of a conventional mill blank for dental CAD/CAM (disk) 1. In the conventional mill blank for dental CAD/CAM, a joint portion to the CAM is constituted of a ceramic portion. Therefore, when the mill blank for dental CAD/CAM is joined to the CAM, the mill blank for dental CAD/CAM is often damaged. In addition, in the conventional mill blank for dental CAD/CAM, cracking and chipping occur by vibration in the middle of cutting to prepare a defective product. Further, falling off of the mill blank for dental CAD/CAM may occurs and a cutting tool which cuts the mill blank for dental CAD/CAM is damaged.

Figure 2A:
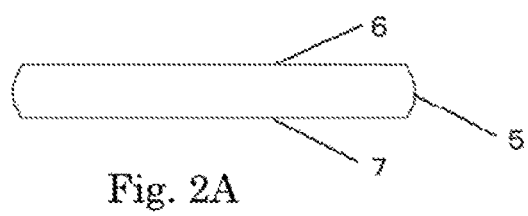
FIG. 2(A) is a side view of a ceramic portion of a mill blank for dental CAD/CAM of one embodiment of the present disclosure.
Figure 2B:
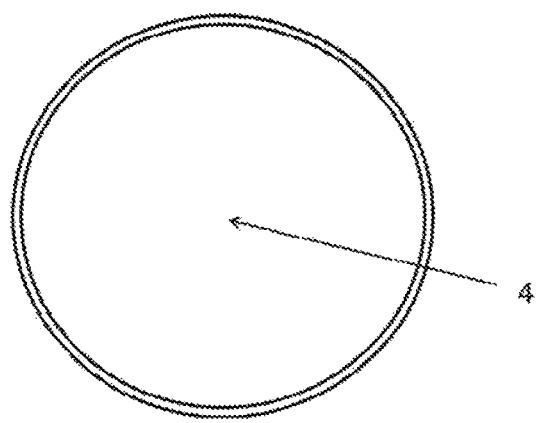
FIG. 2(B) is a plane view of a ceramic portion of a mill blank for dental CAD/CAM of one embodiment of the present disclosure.

FIG. 2(A) is a side view of a ceramic portion 4 of a mill blank for dental CAD/CAM of one embodiment of the present disclosure and FIG. 2(B) is a plane view of a ceramic portion 4 of a mill blank for dental CAD/CAM of one embodiment of the present disclosure. It is understood that a side surface portion 5 is protruded as seen from the side surface of the columnar shape, in the side view. Further, it is understood that an upper surface 6 and a bottom surface 7 are parallel to each other. The ceramic portion 4 has a circular shape as seen from the upper surface side of the columnar shape, in the plane view. Further, because the side surface portion 5 is protruded, the protruded portion is shown.

FIG. 3(A) is a side view of a resin portion 8 having a belt shape used in a mill blank for dental CAD/CAM of one embodiment of the present disclosure. FIG. 3(B) is a plane view of the resin portion 8 having a belt shape. FIG. 3(C) is a sectional view of a resin portion 8 having a belt shape. The ceramic portion is inserted in a circular space located in the center of the resin portion 8 shown in FIG. 3(A) to constitute a mill blank for dental CAD/CAM of present embodiment. In FIG. 3(A), although both ends of the resin portion 8 having a belt shape are shown, a part of a middle portion of the resin portion 8 is not shown in order to facilitate understanding. In FIG. 3(C), sections are not hatched in order to facilitate understanding of components.

It is understood from FIG. 3(A) and FIG. 3(B) that the recesses 2 are formed over the whole of the belt shape, and the recesses 2 are formed over the whole of the resin portion 8 except a gap 10. Because two recesses 2 are formed on the resin portion 8, the resin portion 8 has a remaining portion 3 in the center region in the axial direction of the columnar shape of the mill blank for dental CAD/CAM. Further, because the both ends of the belt do not contact with each other, the gap 10 is provided between the both ends of the belt.

Specifically, in a state that the resin portion 8 is attached to the side surface of the ceramic portion 4, the mill blank for dental CAD/CAM 1 has a first recess 21 opening to an upper surface of the mill blank for dental CAD/CAM 1 and a second recess 22 opening to a bottom surface of the mill blank for dental CAD/CAM 1. The first recess 21 includes a first surface 21a which is parallel to the upper surface of the mill blank for dental CAD/CAM 1 and a second surface 21b which is a circumferential surface concentric with the circumferential surface of the mill blank for dental CAD/CAM 1 and is vertical to the first surface 21a. The second recess 22 includes a first surface 22a which is parallel to the bottom surface of the mill blank for dental CAD/CAM 1 and a second surface 22b which is a circumferential surface concentric with the circumferential surface of the mill blank for dental CAD/CAM 1 and is vertical to the first surface 22a.

FIG. 3(B) shows the resin portion 8 as seen from the axial direction of the columnar shape of the mill blank for dental CAD/CAM. In FIG. 3(B), the resin portion 8 has a substantially cylindrical shape. The remaining portion 3 of the resin portion, which is formed by recesses 2 and is positioned in the center region in the axial direction of the columnar shape of the mill blank for dental CAD/CAM, is shown on a circumference portion 8a of the resin portion 8. An inner surface 9 having a substantially cylindrical shape is a surface coming into contact with the ceramic portion. The resin portion 8 constitutes a part of the upper surface and a part of the bottom surface of the mill blank for dental CAD/CAM in a substantially circumferential shape. Therefore, in the plane view, an upper surface portion 8b which is constituted of the resin portion 8 is shown in the inside of the remaining portion 3 of the resin portion, which is formed by recesses 2 and is positioned in the center region in the axial direction of the columnar shape of the mill blank for dental CAD/CAM.

FIG. 3(C) is a sectional view of a resin portion 8 cut along a surface including the center axis of the columnar shape of the mill blank for dental CAD/CAM. Because the resin portion has recesses 2 as similar to FIG. 3(A), the remaining portion 3 of the resin portion, which is positioned in the center region in the axial direction of the columnar shape of the mill blank for dental CAD/CAM, is shown. The resin portion has an inner surface 9 coming into contact with the side surface of the ceramic portion. The inner surface 9 has a circular arc shape in FIG. 3(C).

In FIG. 3(C), an upper surface portion 8b and a bottom surface portion 8c of the resin portion 8 are shown between the inner surface 9 coming into contact with the side surface of the ceramic portion and the recesses 2. It is preferable that the upper surface portion 8b of the resin portion 8 and the upper surface of the ceramic portion mounted with the resin portion 8 form the same plane and the bottom surface portion 8c of the resin portion 8 and the bottom surface of the ceramic portion mounted with the resin portion 8 form the same plane, respectively. When a common resin portion is used for the ceramic portions having 14, 18 or 26 mm of the height, it is preferable that the upper surface portion 8b of the common resin portion 8 and the upper surface of any one among these ceramic portion form the same plane and the bottom surface portion 8c of the common resin portion 8 and the bottom surface of any one among these ceramic portion form the same plane, respectively. Alternatively, the resin portions having 14, 18 or 26 mm of the height may be prepared in accordance with the ceramic portions having 14, 18 or 26 mm of the height. In this case, the upper surface portion 8b of the resin portion 8 and the upper surface of the ceramic portion form the same plane and the bottom surface portion 8c of the resin portion 8 and the bottom surface of the ceramic portion form the same plane, in each height.

FIG. 4(A) is a side view of a resin portion having a cylindrical shape used in a mill blank for dental CAD/CAM of one embodiment of the present disclosure. FIG. 4(B) is a sectional view of a resin portion having a cylindrical shape used in a mill blank for dental CAD/CAM of one embodiment of the present disclosure. The ceramic portion is inserted in the inside of the resin portion.

The recesses 2 are formed over the whole of the cylindrical shape except slits. Although FIG. 4(A) shows one side of the side view, the slits 11 are formed over the whole of the resin portion evenly. The slits 11 prevent the recesses from being formed over the whole of the mill blank for dental CAD/CAM. However, a dental restoration may be cut out without a cracking and a chipping. In the mill blank for dental CAD/CAM of the present embodiment, a joint portion to the CAM is constituted of the ceramic portion. Therefore, the mill blank for dental CAD/CAM may be strongly mounted on the CAM. Further, the ceramic portion may be easily and strongly fitted in the resin portion by the spring structure of the slits to strongly hold the ceramic portion.

The remaining portion 3 of the resin portion, which is formed by recesses 2 and is positioned in the center region in the axial direction of the columnar shape of the mill blank for dental CAD/CAM, is cut by all slits 11. The resin portion is cut to the bottom surface or to the upper surface by one end of the slit 11. However, the resin portion is not cut from the bottom surface to the upper surface by one slit 11. In the present embodiment, the slit which cut the resin portion to the bottom surface and the slit which cut the resin portion to the upper surface are located at equal intervals alternately on the cylindrical resin portion.

FIG. 4(B) is a sectional view of the resin portion cut along a surface including the center axis of the columnar shape of the mill blank for dental CAD/CAM, as similar to FIG. 3(C). Because the resin portion has recesses 2 as similar to FIG. 4(A), the remaining portion 3 of the resin portion, which is positioned in the center region in the axial direction of the columnar shape of the mill blank for dental CAD/CAM, is shown. The resin portion has an inner surface 9 coming into contact with the side surface of the ceramic portion. The inner surface 9 has a circular arc shape as similar to FIG. 3(C).

In FIG. 4(B), an upper surface portion and a bottom surface portion of the resin portion are shown between the inner surface 9 coming into contact with the side surface of the ceramic portion and the recesses 2. It is preferable that the upper surface portion of the resin portion and the upper surface of the ceramic portion mounted with the resin portion form the same plane and the bottom surface portion of the resin portion and the bottom surface of the ceramic portion mounted with the resin portion form the same plane, respectively. When a common resin portion is used for the ceramic portions having 14, 18 or 26 mm of the height, it is preferable that the upper surface portion of the common resin portion and the upper surface of any one among these ceramic portion form the same plane and the bottom surface portion of the common resin portion and the bottom surface of any one among these ceramic portion form the same plane, respectively. Alternatively, the resin portions having 14, 18 or 26 mm of the height may be prepared in accordance with the ceramic portions having 14, 18 or 26 mm of the height. In this case, the upper surface portion of the resin portion and the upper surface of the ceramic portion form the same plane and the bottom surface portion of the resin portion and the bottom surface of the ceramic portion form the same plane, in each height.

In FIG. 4(B), a region 11A which is cut from the upper surface by slits is shown by hatched oblique lines to indicate more clearly a slit portion. The resin portion is cut by slits from the upper surface to the remaining portion 3 of the resin portion, which is formed by recesses 2 and is positioned in the center region in the axial direction of the columnar shape of the mill blank for dental CAD/CAM. Further, the resin portion is cut by slits from the bottom surface to the remaining portion 3 of the resin portion, which is formed by recesses 2 and is positioned in the center region in the axial direction of the columnar shape of the mill blank for dental CAD/CAM. Further, the slits in the inner surface direction and in the outer surface direction is constituted of a surface vertical to the center axis of the columnar shape.

FIG. 5 is a plane view of the resin portion having the cylindrical shape used in the mill blank for dental CAD/CAM shown in FIG. 4(A) and FIG. 4(B). FIG. 5 shows the resin portion as seen from the axial direction of the columnar shape of the mill blank for dental CAD/CAM. In FIG. 5, the resin portion has a substantially cylindrical shape. The remaining portion 3 of the resin portion, which is formed by recesses 2 and is positioned in the center region in the axial direction of the columnar shape of the mill blank for dental CAD/CAM, is shown on a circumference portion of the resin portion 8. An inner surface 9 having a substantially cylindrical shape is a surface coming into contact with the ceramic portion. The resin portion 8 constitutes a part of the upper surface and a part of the bottom surface of the mill blank for dental CAD/CAM in a substantially circumferential shape. Therefore, in the plane view, an upper surface portion 8b which is constituted of the resin portion 8 is shown in the inside of the remaining portion 3 of the resin portion, which is formed by recesses 2 and is positioned in the center region in the axial direction of the columnar shape of the mill blank for dental CAD/CAM.

The slits formed to the bottom surface and the slits formed to the upper surface are located at equal intervals alternately on the cylindrical resin portion. Therefore, in FIG. 5, it seems that slits formed only on the remaining portion 3 of the resin portion, which is formed by recesses 2 and is positioned in the center region in the axial direction of the columnar shape of the mill blank for dental CAD/CAM, are located on the both sides in the circumference direction of the slits formed from the inside to the outside of the cylindrical shape.

FIG. 6(A) is a side view of a resin portion having a cylindrical shape used in a mill blank for dental CAD/CAM of other embodiment of the present disclosure. FIG. 6(B) is a sectional view of a resin portion having a cylindrical shape used in a mill blank for dental CAD/CAM of other embodiment of the present disclosure. The mill blank for dental CAD/CAM of FIG. 6(A) and FIG. 6(B) is a variation of the mill blank for dental CAD/CAM of FIG. 4(A), FIG. 4(B) and FIG. 5. The ceramic portion is inserted in the inside of the resin portion.

The recesses 2 are formed over the whole of the cylindrical shape except slits. Although FIG. 6(A) shows one side of the side view, the slits 11 are formed over the whole of the resin portion evenly. The slits 11 prevent the recesses from being formed over the whole of the mill blank for dental CAD/CAM. However, a dental restoration may be cut out without a cracking and a chipping. In the mill blank for dental CAD/CAM of the present embodiment, a joint portion to the CAM is constituted of the ceramic portion. Therefore, the mill blank for dental CAD/CAM may be strongly mounted on the CAM. Further, the ceramic portion may be easily and strongly fitted in the resin portion by the spring structure of the slits to strongly hold the ceramic portion.

Slits 12A are formed in the remaining portion 3 of the resin portion, which is formed by recesses 2 and is positioned in the center region in the axial direction of the columnar shape of the mill blank for dental CAD/CAM, and are formed from the remaining portion 3 to the substantially middle of the recess 2 toward the upper surface and the substantially middle of the recess 2 toward the bottom surface. Slits 12B are formed from the remaining portion 3 of the resin portion, which is formed by recesses 2 and is positioned in the center region in the axial direction of the columnar shape of the mill blank for dental CAD/CAM, to the upper surface or the bottom surface, and is not formed in the remaining portion 3 of the resin portion. In the present embodiment, slits 12A and slits 12B are located at equal intervals alternately on the cylindrical resin portion.

FIG. 6(B) is a sectional view of the resin portion cut along a surface including the center axis of the columnar shape of the mill blank for dental CAD/CAM, as similar to FIG. 3(C). Because the resin portion has recesses 2 as similar to FIG. 6(A), the remaining portion 3 of the resin portion, which is positioned in the center region in the axial direction of the columnar shape of the mill blank for dental CAD/CAM, is shown. The resin portion has an inner surface 9 coming into contact with the side surface of the ceramic portion. The inner surface 9 has a circular arc shape as similar to FIG. 3(C).

In FIG. 6(B), an upper surface portion and a bottom surface portion of the resin portion are shown between the inner surface 9 coming into contact with the side surface of the ceramic portion and the recesses 2. It is preferable that the upper surface portion of the resin portion and the upper surface of the ceramic portion mounted with the resin portion form the same plane and the bottom surface portion of the resin portion and the bottom surface of the ceramic portion mounted with the resin portion form the same plane, respectively.

When a common resin portion is used for the ceramic portions having 14, 18 or 26 mm of the height, it is preferable that the upper surface portion of the common resin portion and the upper surface of any one among these ceramic portion form the same plane and the bottom surface portion of the common resin portion and the bottom surface of any one among these ceramic portion form the same plane, respectively. Alternatively, the resin portions having 14, 18 or 26 mm of the height may be prepared in accordance with the ceramic portions having 14, 18 or 26 mm of the height. In this case, the upper surface portion of the resin portion and the upper surface of the ceramic portion form the same plane and the bottom surface portion of the resin portion and the bottom surface of the ceramic portion form the same plane, in each height.

Figure 7:
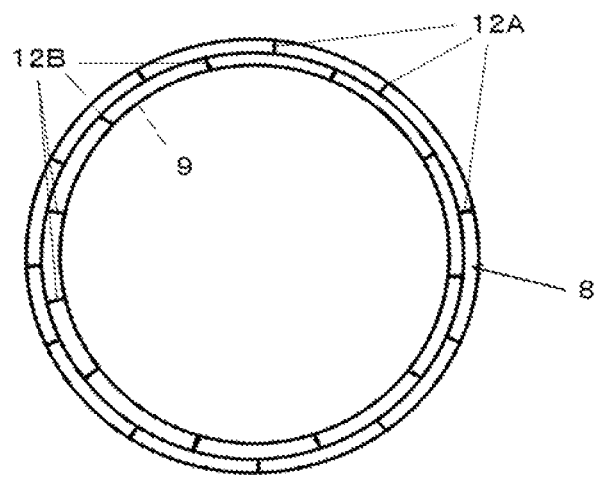
FIG. 7 is a plane view of the mill blank for dental CAD/CAM using the resin portion having the cylindrical shape shown in FIG. 6(A) and FIG. 6(B).

FIG. 7 is a plane view of the mill blank for dental CAD/CAM using the resin portion having the cylindrical shape shown in FIG. 6(A) and FIG. 6(B). FIG. 7 shows the mill blank for dental CAD/CAM as seen from the axial direction of the columnar shape of the mill blank for dental CAD/CAM. In FIG. 7, the resin portion has substantially cylindrical shape. The remaining portion 3 of the resin portion, which is formed by recesses 2 and is positioned in the center region in the axial direction of the columnar shape of the mill blank for dental CAD/CAM, is shown on a circumference portion of the resin portion 8. An inner surface 9 having a substantially cylindrical shape is a surface coming into contact with the ceramic portion. The resin portion 8 constitutes a part of the upper surface and a part of the bottom surface of the mill blank for dental CAD/CAM in a substantially circumferential shape. Therefore, in the plane view, an upper surface portion which is constituted of the resin portion 8 is shown in the inside of the remaining portion 3 of the resin portion, which is formed by recesses 2 and is positioned in the center region in the axial direction of the columnar shape of the mill blank for dental CAD/CAM. A specific configuration of the slit is the same as the configuration explained for FIG. 6(A) and FIG. 6(B).

Figure 8A:
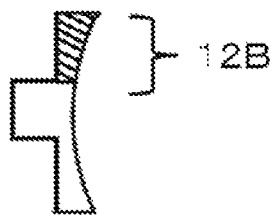
FIG. 8(A) is a sectional view of a resin portion having a cylindrical shape shown in FIG. 6(A), FIG. 6(B), FIG. 7(A) and FIG. 7(B).
Figure 8B:
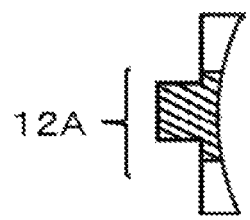
FIG. 8(B) is a sectional view of a resin portion having a cylindrical shape shown in FIG. 6(A), FIG. 6(B), FIG. 7(A) and FIG. 7(B).
Figure 8C:
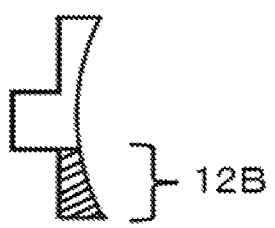
FIG. 8(C) is a sectional view of a resin portion having a cylindrical shape shown in FIG. 6(A), FIG. 6(B), FIG. 7(A) and FIG. 7(B).

FIGS. 8(A) to 8(C) are a sectional view of a resin portion having a cylindrical shape shown in FIG. 6(A), FIG. 6(B), FIG. 7(A) and FIG. 7(B). In FIGS. 8(A) to 8(C), a region which is cut by a slit is shown by hatched oblique lines to indicate a slit portion.

In FIG. 8(A), an outer slit 12B is shown. The outer slit 12B is formed to the upper surface, and is not formed within the remaining portion 3 of the resin portion, which is formed by recesses 2 and is positioned in the center region in the axial direction of the columnar shape of the mill blank for dental CAD/CAM. The slit portion of the outer slit 12B is shown by hatched oblique lines.

In FIG. 8(B), an inner slit 12A is shown. The inner slit 12A is formed within the remaining portion 3 of the resin portion, which is formed by recesses 2 and is positioned in the center region in the axial direction of the columnar shape of the mill blank for dental CAD/CAM, and is formed from the remaining portion 3 to a position slightly extending from the remaining portion 3 toward the upper surface and a position slightly extending from the remaining portion 3 toward the bottom surface. The slit portion of the outer slit 12B is shown by hatched oblique lines.

In FIG. 8(C), an outer slit 12B is shown. The outer slit 12B is formed to the bottom surface, and is not formed within the remaining portion 3 of the resin portion, which is formed by recesses 2 and is positioned in the center region in the axial direction of the columnar shape of the mill blank for dental CAD/CAM. The slit portion of the outer slit 12B is shown by hatched oblique lines.

FIG. 9(A) is a side view of a conventional holding portion of the CAM. FIG. 9(B) is a side view of a conventional holding portion of the CAM viewed from a different direction from the direction of FIG. 9(A). FIG. 10(A) is a plane view of a conventional holding portion of the CAM. FIG. 10(B) is a sectional view taken along the line A-A' of FIG. 10(A). The mill blank for dental CAD/CAM is held by connecting one sides of two half cylindrical holding members 16 by a hinge 13, closing other sides of two half cylindrical holding members so as to wrap the mill blank for dental CAD/CAM with a cylinder which is formed by two half cylindrical holding members and fastening other sides of two half cylindrical holding members with screw 14. The holding portion of the CAM has an arm 15 joining with the CAM in order to connect to the CAM.

Further, a fitting portion 17 which fits in the recess 2 of the mill blank for dental CAD/CAM is shown in FIG. 10(B). The mill blank for dental CAD/CAM is fixed by fitting the fitting portion 17 in the recess 2 of the mill blank for dental CAD/CAM when the mill blank for dental CAD/CAM is installed. The fitting portion 17 is formed over the whole of the circumference of the holding portion 16. Further, a joint portion 18 which joins with the mill blank for dental CAD/CAM is shown in FIG. 10(B). The joint portion 18 is inserted with the remaining portion of the resin portion which is formed by recesses 2 and is positioned in the center region in the axial direction of the columnar shape of the mill blank for dental CAD/CAM.

In the present embodiment, by holding the resin portion of the mill blank for dental CAD/CAM, it may be prevented that a breakage such as cracking and chipping and falling off from the holding portion occur.

With respect to the use of substantially any plural and/or singular terms herein, those having skill in the art can translate from the plural to the singular and/or from the singular to the plural as is appropriate to the context.

Although the description herein has been given with reference to the drawings and embodiments, it should be noted that those skilled in the art may make various changes and modifications on the basis of this disclosure without difficulty. Accordingly, any such changes and modifications are intended to be included in the scope of the embodiments.

INDUSTRIAL APPLICABILITY

A mill blank for dental CAD/CAM of the present disclosure may be specifically used for a disk for preparing a dental restoration by cutting and machining using CAD/CAM technique in the dental field.

What is claimed is:

1. A mill blank for dental CAD/CAM containing a ceramic material for preparing a dental restoration by being installed in a CAD/CAM device, wherein,
   the mill blank for dental CAD/CAM comprises a ceramic portion in which a dental restoration is cut out and a resin portion which joins with a CAD/CAM device,
   the resin portion is provided at a side surface of the ceramic portion and has a cylindrical shape or a belt shape,
   the side surface of the ceramic portion has a circumferential surface shape,
   a ceramic portion side of the resin portion contacts with the side surface of the ceramic portion,
   the ceramic portion side of the resin portion has a shape along the side surface having the circumferential surface shape of the ceramic portion,
   the ceramic portion has a circular columnar shape,
   the ceramic portion has a protrusion part on the side surface,
   the protrusion part smoothly protrudes beyond an upper edge and a lower edge of the ceramic portion in the radial direction of the circumference of the side surface of the circumferential surface shape except for a transition portion of an upper surface and the side surface of the ceramic portion and a transition portion of a bottom surface and the side surface of the ceramic portion.

2. The mill blank for dental CAD/CAM of claim 1, wherein,
   an exterior side surface of the resin portion is an exterior side surface of the mill blank for dental CAD/CAM.

3. The mill blank for dental CAD/CAM of claim 1, wherein,
   in a state that the resin portion is attached to the side surface of the ceramic portion, a height of the resin portion of the mill blank for dental CAD/CAM is the same as a height of the ceramic portion of the mill blank for dental CAD/CAM,
   when the resin portion has the belt shape, the both ends of the resin portion do not contact with each other to provide a gap between the both ends, in a state that the resin portion is attached to the side surface of the ceramic portion,
   when the resin portion has the cylindrical shape, the resin portion has at least one slit.

4. The mill blank for dental CAD/CAM of claim 1, wherein,
   a part of an upper surface of the mill blank for dental CAD/CAM and a part of a bottom surface of the mill blank for dental CAD/CAM consist of the resin portion.

5. The mill blank for dental CAD/CAM of claim 1, wherein
   the ceramic portion consists of a ceramic material which is semi-sintered or is not subjected to final sintering.

6. The mill blank for dental CAD/CAM of claim 5, wherein
   the ceramic material contains alumina or zirconia at a ratio of 95 wt. % or more.

7. The mill blank for dental CAD/CAM of claim 5, wherein
   a primary average particle diameter of the ceramic material is within the range of 0.01 to 10 μm.

8. An adaptor for a mill blank for dental CAD/CAM used in the mill blank for dental CAD/CAM of claim 1, wherein
   the adaptor consists of the resin portion which is attached to the ceramic portion of the mill blank for dental CAD/CAM.

9. A cut portion for a mill blank for dental CAD/CAM used in the mill blank for dental CAD/CAM of claim 1, wherein
   the cut portion consists of the ceramic portion of the mill blank for dental CAD/CAM.

10. The mill blank for dental CAD/CAM of claim 1, wherein,
    the upper surface and the bottom surface of the ceramic portion are parallel to each other,
    the mill blank for dental CAD/CAM has at least two recesses which includes a first recess and a second recess in a circumference portion,
    the first recess and the second recess respectively include a first surface which is parallel to the upper surface and the bottom surface and a second surface which is a circumferential surface concentric with the circumferential surface of the mill blank for dental CAD/CAM and is vertical to the first surface, and
    the at least two recesses are formed within the resin portion.

11. The mill blank for dental CAD/CAM of claim 10, wherein,
    a diameter of a columnar shape of the mill blank for dental CAD/CAM is within a range of 95 to 100 mm, and a height of the columnar shape of the mill blank for dental CAD/CAM is within a range of 10 to 35 mm.

12. The mill blank for dental CAD/CAM of claim 11, wherein,
   a diameter of the columnar shape of the ceramic portion is within a range of 90 to 96 mm, and a height of the columnar shape of the ceramic portion is within a range of 10 to 35 mm.

13. The mill blank for dental CAD/CAM of claim 12, wherein,
   a distance between the first recess and the second recess in the axial direction of the columnar shape of the mill blank for dental CAD/CAM is within a range of 9 to 11 mm.

14. The mill blank for dental CAD/CAM of claim 13, wherein,
   a dimension from the center axis of the columnar shape of the mill blank for dental CAD/CAM to the first recess and the second recess is within a range of 91 to 98 mm.

15. The mill blank for dental CAD/CAM of claim 10, wherein,
   a diameter of the columnar shape of the mill blank for dental CAD/CAM is 98 mm, and the height of the columnar shape of the mill blank for dental CAD/CAM is 14, 18 or 26 mm,
   a distance between the first recess and the second recess in the axial direction of the columnar shape of the mill blank for dental CAD/CAM is 10 mm, and
   a dimension from the center axis of the columnar shape of the mill blank for dental CAD/CAM to the first recess and the second recess is 94 mm.

16. The mill blank for dental CAD/CAM of claim 1, wherein,
   the protrusion part is in the form of an arc protruding from the upper edge and the lower edge of the ceramic portion.

* * * * *